UNITED STATES PATENT OFFICE.

PAUL SEIDEL, OF LUDWIGSHAFEN, GERMANY, ASSIGNOR TO BADISCHE ANILIN & SODA FABRIK, OF LUDWIGSHAFEN, GERMANY, A CORPORATION OF BADEN.

INDIGO-DIACETIC ACID AND PROCESS OF MAKING SAME.

SPECIFICATION forming part of Letters Patent No. 699,581, dated May 6, 1902.

Application filed February 23, 1901. Serial No. 48,576. (Specimens.)

*To all whom it may concern:*

Be it known that I, PAUL SEIDEL, doctor of philosophy and chemist, a subject of the King of Saxony, residing at Ludwigshafen-on-the-Rhine, in the Kingdom of Bavaria and Empire of Germany, have invented new and useful Improvements in Indigo-Diacetic Acid and Process of Making the Same, of which the following is a specification.

In order to obtain phenyl-glycocol-orthocarboxylic acid for the manufacture of indigo, anthranilic acid is condensed with monochlor-acetic acid. I have found that in this reaction a by-product is sometimes formed which apparently has the constitution represented by the following formula

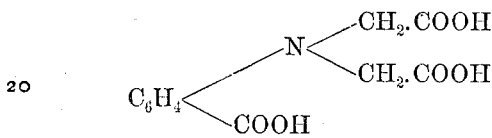

and which may be called "anthranilo-diacetic acid." I have found that a good yield of this body can be obtained by treating anthranilic acid with two (2) molecular proportions of mono-haloid acetic acid or by the condensation of equal molecular proportions of monohaloid acetic acid and phenyl-glycocol-orthocarboxylic acid. Both reactions are preferably effected in the presence of alkalies or the like. The new anthranilo-diacetic acid is readily soluble in hot water, but less soluble in alcohol and ether. Its solution has an intensely blue fluorescence. I have further found that this body can readily be converted into indoxyl compounds, and these again are easily converted into indigo or derivatives thereof. This reaction can be caused to take place by treatment with various condensation agents, and different intermediate products and indigo coloring-matters are obtained, according to the condensation agent chosen and the means of working. For instance, if the new acid be treated with an alkali or an alkaline earth in aqueous solution an indoxyl derivative is obtained which I term "indoxylacetic acid." This product can also be obtained by the use of sodium acetate, chlorid of zinc, or sulfuric acid as the condensation agent or by treating the salts of anthraniloacetic acid with acetic anhydrid. This indoxyl-acetic acid can be recrystallized from its solution in hot water. The crystals melt on heating and decompose. The aqueous solution has an intensely green fluorescence.

Another method of converting the anthranilo-diacetic acid into an indoxyl derivative consists in heating it in the form of its dry salts with a caustic alkali at a temperature of about two hundred (200°) degrees centigrade and treating with cold dilute mineral acids the melt obtained. In this way a product is obtained which I regard as indoxyl-acetic carboxylic acid. It is possible that this product occurs as an intermediate product in the reaction for the production of indoxyl-acetic acid hereinbefore described, for if its aqueous solution be heated carbonic acid is evolved and the indoxyl-acetic acid is obtained. Upon heating the indoxyl-acetic-carboxylic acid melts and decomposes.

Both the new indoxyl derivatives mentioned can be readily oxidized in alkaline, neutral, or acid solution, and so be converted into the corresponding indigo coloring-matter—namely, indigo-diacetic acid. This can be crystallized from hot water and on heating melts and decomposes. It is readily soluble in alcohol and in ether.

If the dry salts of the anthranilo-diacetic acid be heated in the caustic alkali melt at a high temperature, with or without the addition of quicklime, then as the final product a melt containing indoxyl itself is obtained. In all probability intermediate products—for instance, methyl-indoxyl—are also formed during this treatment, for if a melt obtained between the temperatures of two hundred (200°) to two hundred and eighty (280°) degrees centigrade be oxidized the indigo coloring-matter obtained consists, at least in part, of dimethyl indigo, while upon oxidizing melts obtained at a higher temperature indigo itself is the product. Again, some melts upon oxidation yield, among other products, a coloring-matter which is slightly soluble in water and which is probably indigo-monoacetic acid or methyl-indigo-mono-acetic acid.

The following examples will serve to further illustrate the manner in which my invention may be carried into practical effect; but the invention is not confined to the reactions exemplified. The parts are by weight.

*Example 1—Production of anthranilo-diacetic acid from anthranilic acid and chloracetic acid.*—Dissolve about one hundred and thirty-seven (137) parts of anthranilic acid and one hundred and ninety (190) parts of chlor-acetic acid in one thousand (1,000) parts of water containing one hundred and sixty-five (165) parts of calcined soda. Heat the solution for a long time—say for about ten (10) hours—at a temperature of eighty (80°) degrees centigrade. The anthranilo-diacetic acid formed can be precipitated by treatment with dilute sulfuric acid.

*Example 2—Production of indoxyl-acetic acid using caustic-soda solution as condensation agent.*—Dissolve two hundred and fifty-three (253) parts of anthranilo-diacetic acid in five hundred (500) parts of caustic-soda lye (containing about thirty-five (35) per cent. of NaOH.) Heat the solution to boiling in a vessel provided with an inverted condenser and maintain the heat for, say, about ten (10) hours. Allow the solution to cool, dilute it with water, and pour the cold solution into cold sulfuric acid. The indoxyl-acetic acid separates out usually in the form of yellow crystals.

*Example 3—Production of indoxyl-acetic-carboxylic acid in a caustic-potash melt.*—Mix together about three hundred and nineteen (319) parts of the neutral sodium salt of anthranilo-diacetic acid and five hundred (500) parts of solid caustic potash. Heat the mixture for an hour at a temperature of two hundred (200°) degrees centigrade. Allow the melt to cool, reduce it to powder, and add this gradually to cold dilute sulfuric acid. The indoxyl-acetic-carboxylic acid separates out, and in contact with the air it soon assumes a blue color.

*Example 4—Production of indigo-diacetic acid.*—Mix the alkaline solution obtained according to Example 2 with ten thousand (10,000) parts of water or dissolve the melt obtained according to Example 3 in this quantity of water and blow air through the solution. The new indigo coloring-matter forms and can be precipitated from the solution by acidifying with dilute sulfuric acid. It dyes wool blue-green from the acid bath.

*Example 5—Production of indigo from anthranilo-diacetic acid.*—Mix intimately about three hundred and nineteen (319) parts of the neutral sodium salt of anthranilo-diacetic acid with five hundred (500) parts of caustic potash and three hundred (300) parts of quicklime. Heat the mixture for an hour at a temperature of three hundred (300°) degrees centigrade. Allow the melt to cool, dissolve it in water, blow air through the solution, and collect the indigo by filtration.

Now what I claim is—

1. The process of making indigo-diacetic acid which consists in treating anthranilic acid with two (2) molecular proportions of mono-haloid-acetic acid and then treating this product successively with caustic alkali, water and air.

2. The process of making indigo-diacetic acid which consists in treating anthranilo-diacetic acid successively with caustic alkali, water, and air.

3. The process of making indigo-diacetic acid which consists in treating indoxyl-acetic-carboxylic acid in the presence of caustic alkaline solution with air.

4. The process of making indigo-diacetic acid which consists in treating anthranilic acid successively with mono-haloid-acetic acid, caustic alkali, water, and air.

5. The process of making indigo-diacetic acid which consists in treating anthranilic acid successively with mono-chlor-acetic acid, caustic potash, water, and air.

6. As a new article of manufacture the new indigo coloring-matter, namely, indigo-diacetic acid which is soluble in hot water yielding crystals upon cooling, which upon heating melts and decomposes and which is readily soluble in alcohol and in ether, substantially as described.

In testimony whereof I have hereunto set my hand in the presence of two subscribing witnesses.

PAUL SEIDEL.

Witnesses:
PAUL JULIUS,
JOHN L. HEINKE.